United States Patent

Hodgson

[15] 3,654,567

[45] Apr. 4, 1972

[54] VAPOR DISCHARGE CELL

[72] Inventor: Rodney T. Hodgson, Somers, N.Y.

[73] Assignee: International Business Machines Corporation, Armonk, N.Y.

[22] Filed: Dec. 31, 1970

[21] Appl. No.: 103,240

[52] U.S. Cl. ....... 331/94.5, 165/105, 313/180

[51] Int. Cl. ....... H01s 3/02

[58] Field of Search ....... 331/94.5; 313/180; 165/105

[56] References Cited

UNITED STATES PATENTS

| | | | |
|---|---|---|---|
| 3,379,302 | 4/1968 | Burggraaf et al. | 331/94.5 UX |
| 3,405,299 | 10/1968 | Hall et al. | 165/105 X |
| 3,441,752 | 4/1969 | Grover et al. | 165/105 UX |
| 3,457,436 | 7/1969 | Levedahl | 165/105 X |
| 3,460,524 | 8/1969 | Lazaridis | 165/105 X |
| 3,464,025 | 8/1969 | Bell | 331/94.5 |
| 3,484,720 | 12/1969 | Walter | 331/94.5 |
| 3,543,841 | 12/1970 | Eastman | 165/105 X |
| 3,563,309 | 2/1971 | Basiulis | 165/105 |
| 3,576,500 | 4/1971 | Gould | 331/94.5 |
| 3,585,524 | 6/1971 | Silfvast | 331/94.5 |

*Primary Examiner*—Ronald L. Wibert
*Assistant Examiner*—Edward S. Bauer
*Attorney*—Hanifin and Jancin and Karl O. Hesse

[57] ABSTRACT

An electrical discharge cell having a plural wick heat pipe for preventing contamination without depleting the supply of vapor source material.

7 Claims, 2 Drawing Figures

INVENTOR
RODNEY T. HODGSON

BY Karl O'Neill

AGENT

VAPOR DISCHARGE CELL

BACKGROUND OF THE INVENTION

1. Field of the Invention

This invention relates to electric discharge cells in general and more specifically to vapor discharge cells suitable for use in a laser.

2. Description of the Prior art

Vapor lasers are well-known in the prior art, however, they have prior to this invention, suffered from a problem of window contamination by condensing vapor. A prior art solution to this problem was to allow the vapor to condense closer to the evaporization source and prevent vapor diffusion to the window with a few torr of pressure of neutral gas. An example of this method of solution is shown in FIG. 3, on page 34, of an article in the Aug., 1969 issue of Laser Focus. A disadvantage of this method of reducing window contamination is that it depletes the reservoir of vapor material at the vaporization source, therefore, the life time of the device is limited. Another disadvantage is that the vapor pressure can vary from the optimum value.

SUMMARY OF THE INVENTION

It is an object of this invention to provide a vapor boundary in a conducting vapor electrical discharge cell to prevent contamination in an improved manner.

It is a further object of this invention to prevent window contamination in vapor lasers without depleting the vapor source material at the vaporization source.

It is a still further object of this invention to prevent window contamination in electrical discharge metal vapors lasers without providing a parasitic current path which would short out the electrical discharge power source.

I accomplished the above objects by employing an improved heat pipe within the discharge chamber. When a conductive vapor source material or a conductive wick material must be used, I separate the wick into two separate wicks, each located near a window. Each provides both a vapor evaporization source and a vapor condensation sink, so that a vapor-liquid circulation effect is set up near each window. My invention includes the discovery that any neutral gas which originally filled the discharge chamber will be pumped out from the central area of the discharge chamber between the wicks by the circulation flow of the vapor-liquid at each of the wicks.

Figure 1:
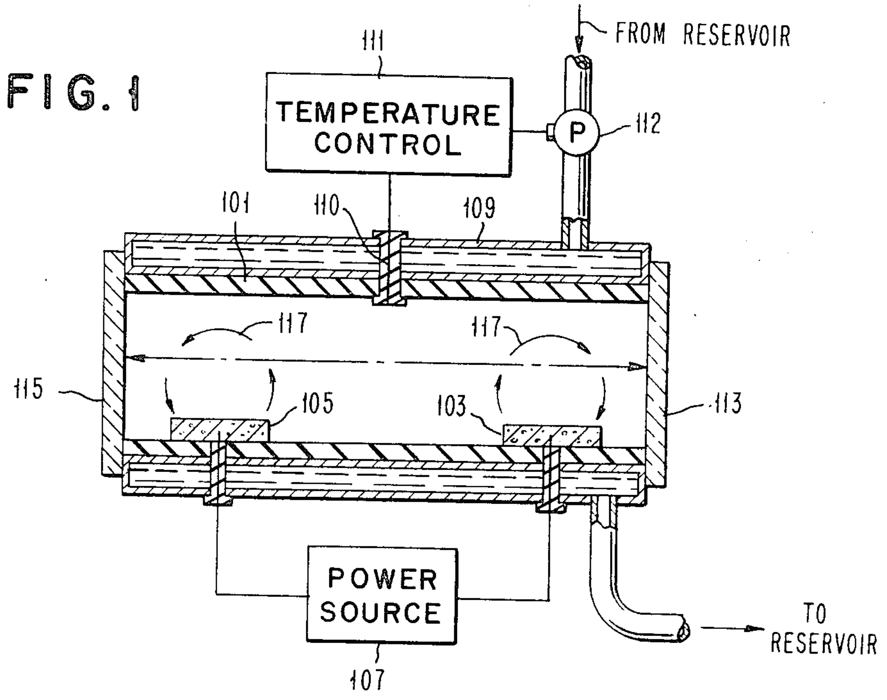
FIG. 1 shows an embodiment of my invention.

DESCRIPTION OF THE PREFERRED EMBODIMENTS:

FIG. 1 shows how the wicks of a metal vapor laser are located within a discharge chamber.

Referring now to FIG. 1, discharge chamber 101 is shown as a tubular chamber. The tubular shape of chamber 101 is not critical to my invention and an annular or other shape could also be used. Discharge chamber 101 is made of an insulating material which can withstand the high temperatures normally encountered within the chamber. Boron nitride, quartz and alumina are examples of high temperature insulating materials suitable for constructing of discharge chamber 101.

A pair of wicks, 103 and 105 are located at each end of the discharge chamber 101 and are separated from each other by a predetermined distance called a discharge path. When an electric discharge is set up within the discharge chamber, it will flow along this separating discharge path between wicks 103 and 105. Wicks 103 and 105 may be made from any number of materials having capillary properties and which are also capable of withstanding the temperatures expected within the chamber. Examples of wick materials are nickel, stainless steel and tantalum. It is preferable in this embodiment, that the wick material be electrically conducting, however, it is not absolutely necessary if the vapor source material which is absorbed within the wicks is an electrical conductor.

Power source 107 is connected between wicks 103 and 105, so that it is electrically connected in series therewith. In those situations, where the wick material is non-conducting, the electrical connection are made between the electrically conducting vapor source material and power source 107 by extending the connection into the wick allowing it to be immersed in the vapor source material. Power source 107 has AC and/or DC and/or pulsed current and voltage capabilities and is controllable for initiating and maintaining an electrical discharge within the discharge chamber.

Alternatively, power can be coupled into the discharge chamber by induction heating using a radio frequency coil wrapped around the tube 101.

A heat exchanger means 109 surrounds the discharge chamber for removing or adding heat to the discharge chamber 101 under control of temperature controlling means 111 to which it is connected. Heat exchanger means 109 may be any of a number of well-known exchanger means, such as a circulating liquid, an electrical heater, or a controllable heat sink/source such as a peltier pile. Temperature control 111 includes a temperature sensing element 110 and a temperature controlling means 112 connected to heat exchanger means 109 to control the temperature within discharge chamber 101. The temperature is controlled to be at the condensation temperature of the vapor source material at the end of each wick near the windows. The electric discharge will raise the temperature in the interior of the discharge chamber to a temperature which will prevent condensation of the vapor within the central portion of the discharge chamber at the operating vapor pressure.

Plates 113 and 115 enclose the volume within discharge chamber 101, if necessary or desired. Plates 113 and 115 may be windows in some instances and mirrors in others or merely free space such as a pressure sensing orifice. In either instance, the proximity of plates 113 and 115 to wicks 103 and 105 prevents vapor from within discharge chamber 101 from condensing on the inner surface of plates 113 and 115 or from entering the free space to be protected.

OPERATION

When in operation, the vapor source material will be a liquid which will be absorbed within wicks 103 and 105. Electrical energy is applied by turning on power source 107 causing an electrical discharge between wicks 103 and 105. This electrical discharge heats the area between wicks 103 and 105 causing some of the vapor source material to evaporate. Because the temperature is highest toward the center of the discharge chamber, material will evaporate from that region of wicks 103 and 105 which is nearest to the center of the discharge chamber. That region is called the evaporation region. After evaporating from the evaporation region of the wicks, the vapor will circulate as shown by arrows 117 and will condense on the outer region of wicks 103 and 105 due to the cooler temperature in these regions of the discharge chamber 101. As a result of the circulation process just described, atoms of neutral gas existing within the central portion of chamber 101 will gradually pump out toward plates 115 and will be replaced by vapor. Temperature control 111 and heat exchanger 109 will operate to control the temperature within the discharge chamber 101 to be at the condensation temperature nearest the windows. The heat pipe effect of the discharge chamber will keep the temperature in the central portion of chamber 101 near the wicks from becoming excessive. In applications where the electric discharge need not be closely controlled for purposes, such as to control a lasing action, the electric discharge can be used to control the temperature within the chamber 101 and heat exchanger 109, then need only be a finned heat sink. Temperature control 111 would then be connected to heat exchanger 109 to sense the temperature but would also be connected to power source 107 in order to control the energy being released within discharge chamber 101. In other applications, which require close control of the electric discharge, heat exchanger 109 will act both as a heat sink and/or as a heat source under control of temperature control 111 to maintain the temperature within the central portion of discharge chamber 101 at a temperature above the vaporization temperature of the source material, and the temperature of the portions near plates 113 and 115 at or below the condensation temperature of the source material. The thermal gradient from the central portion of the chamber 101 to plates 113 and 115 is caused by the release of heat by the electric discharge, primarily, in the central portion of chamber 101.

DESCRIPTION OF AN ALTERNATE EMBODIMENT

Figure 2:
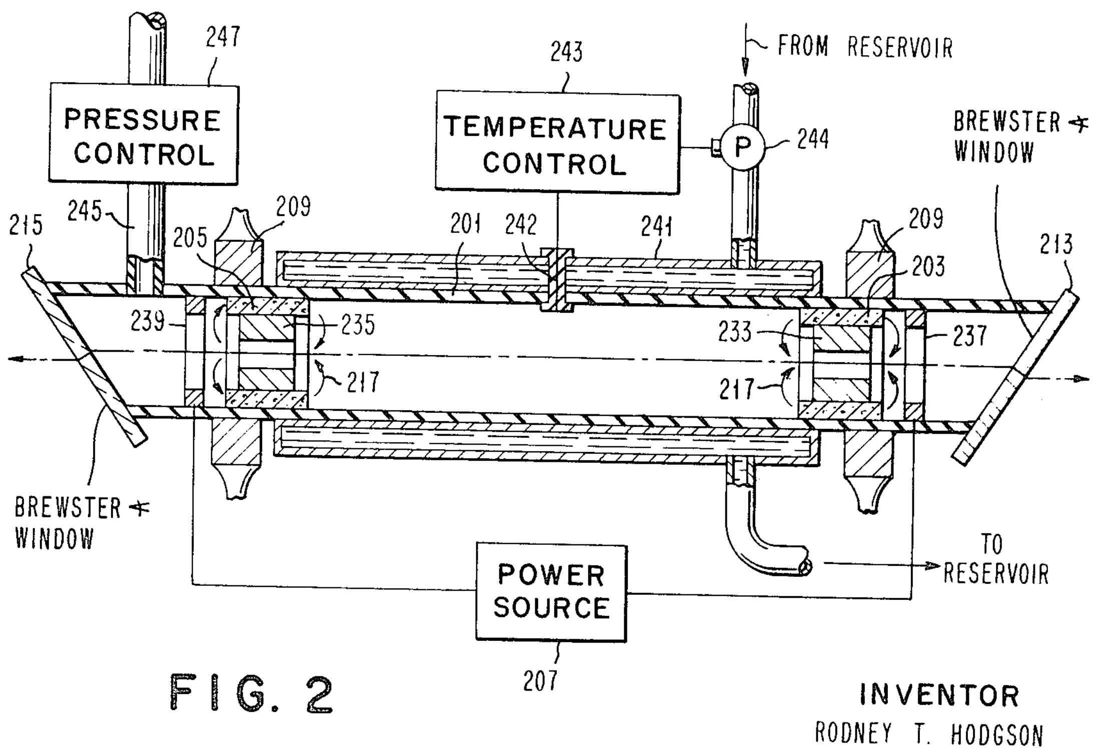
FIG. 2 shows an alternate embodiment.

The following description will set forth an alternate embodiment of the invention which is specifically intended for use as the discharge chamber in a vapor laser. FIG. 2 shows a cross sectional view of the alternate embodiment.

Referring now to FIG. 2, discharge chamber 201 is shown as a tubular chamber, however, it is well-known that lasers need not be of a tubular shape and therefore, this invention is not to be taken as limited thereto. Discharge chamber 201 is made from a strong insulating material such as boron nitride, quartz, or alumina.

A pair of wicks, 203 and 205 are located at each end of the discharge chamber and separated from a material having capillary properties and which is also capable of withstanding the temperature expected within the chamber. Examples of wick material are nickel, stainless steel and tantalum.

A pair of guard rings, 233 and 234 are provided. Guard ring 233 is located within wick 203 and guard 235 is located within wick 205 for the purpose of producing a fairly high length to diameter ratio in the region where the vapor flows.

A pair of electrodes 237 and 239 are provided in order to give a wider design latitude in choosing wick material and vapor source material which may now be non-conducting. Electrode 237 is placed between wick 203 and window 213. Electrode 239 is placed between wick 205 and 215. Electrodes 237 and 239, therefore, lie between and adjacent to windows 213 and 215 respectfully and wicks 203 and 205 lie between the electrodes. The distance between electrodes 237 and 239 define the discharge path in this embodiment. Windows 213 and 215 are set at Brewsters angle in order to minimize reflection losses of light in the laser optical cavity.

Power source 207 is connected between electrodes 237 and 239 so that it is electrically connected in series therewith. Power source 207 can be identical to power source 107 and FIG. 1 and is also controllable for initializing and maintaining an electric discharge within the discharge chamber which will cause the lasing action of the vapor to be vaporized within chamber 201.

A heat exchanger means 209 surrounds each end of discharge chamber 201 enclosing the portion of chamber 201 which contains the condensation area of each wick. Heat exchanger means 209 is a heat sink which maintains the temperature of the area enclosed within it at or below the condensation temperature of the vapor source material being used. Heat exchanger 209 will usually be a simple convection, conduction, and/or radiation type heat sink which is a mere matter of design choice.

A second heat exchanger 241 surrounds the central portion of discharge chamber 201 enclosing the volume of the chamber between the wicks as well as that volume containing the evaporation regions of each wick. Heat exchanger 241 is connected to temperature control 243 for adding or removing heat from the central portion of discharge chamber 201. Heat exchanger 241 may be a circulating liquid type or it may be a combination electrical heater and cooler, such as a peltier pile or any other well-known exchanger capable of adding or removing heat from chamber 201. Heat exchanger 241 is connected to and controlled by a temperature control 243 which detects the temperature within the central portion of chamber 201 at sensing element 242 and maintains this temperature at or above the temperature necessary to give the required vapor pressure of the source material being used by actuating transducer means 244.

A gas inlet and exit orifice 245 is connected to the cavity within chamber 201 and communicates with pressure control 247. Pressure control 247 introduces and controls the pressure of a neutral gas within chamber 201 thereby indirectly controlling the vapor density within chamber 201. A number of neutral gases are well-known to be suitable for use in a vapor laser. Examples are helium, argon and neon.

OPERATION

When the alternate embodiment of the invention is in operation as a laser, vapor source material to be vaporized is absorbed within wicks 203 and 205. Electrical energy is applied by turning on power source 207 and causing an electrical discharge between electrodes 237 and 239. If necessary, temperature control 241 will cause heat exchanger 241 to apply heat to the central portion of chamber 201, in order to bring the temperature therein to the vaporization temperature of the source material. Many suitable lasing source materials are known. Examples are copper, and thallium. It is, of course, well-known that an electrical discharge will create heat and this heat may be sufficient to raise the temperature in the central portion of the cavity to and above the vaporization temperature, vapor source material will begin to vaporize from the evaporization regions of wicks 203 and 205. This will cause an increase in pressure in the central portion of chamber 201 causing some of this vapor to flow toward window 213 and 215. As the vapor enters the areas enclosed by heat exchanger 209, heat will be removed from the vapor causing it to condense on the condensation regions of wicks 203 and 205. Arrows 216 indicates the circulatory flow of vapor from the evaporization region to the condensation region of each wick. As the temperature in the central portion of chamber 201 is raised to higher than that needed to produce a vapor pressure equal to the neutral pressure controlled by pressure control 247, the vapor will pump out all the neutral gas atoms from the central portion of chamber 201 into the end portions of chambers 201, the circulatory flow of vapor. The boundary between the neutral gas and the vapor will be sharply-defined, within a few means path lengths, at a position where sufficient heat has been removed from the vapor so that it can condense on the condensation region of each wick. The central volume of chamber 201 will be filled with pure vapor and the volume adjacent to window 213 and 215 will be filled with pure neutral gas which was originally introduced into chamber 201.

As the vapor condenses on the condensation regions of wicks 203 and 205, it is pulled by a surface tension forces through the wicks to the evaporation regions of the wicks where it is re-evaporated to create a complete cycle. Through the use of the principle of the heat pipe as applied by this invention, a small amount of vapor source material can last indefinitely.

While the invention has been particularly shown and described with reference to preferred embodiments thereof, it will be understood by those skilled in the art that various changes in form and detail may be made without departing from the spirit and scope of the invention. Examples have been recited, such as discharge chamber of annular shape with correspondingly shaped wicks and equivalent means for providing the power or controlling the temperature and/or pressure and exchanging the heat. An example application other than lasers to which this invention would be well suited, is shown in the figure, on page 39, of *Scientific American Magazine*, May, 1968 issue. In this figure, heat is applied to the center of the heat pipe, which transfers the heat to both ends, in a manner which is similar to heat flow in a vapor laser.

What is claimed is:

1. A discharge cell comprising:

a discharge chamber having an electrically insulating inner surface;

a plurality of wicks, each wick having an evaporization region and a condensation region, said wicks being located within said chamber between spaces having elements to be protected from condensate of a vapor source material and a central portion of said discharge chamber;

a vapor source material absorbed within said wicks;

a source of electrical power connected between the evaporization regions of at least two of said wicks for initiating and maintaining an electrical discharge within said chamber;

a heat exchanger means surrounding those portions of said discharge chamber containing condensation regions of said wicks for maintaining the temperature within said portions of said chambers at the condensation temperature of said vapor source material, such that vapor which is evaporated from each of said evaporation regions circulates to the corresponding condensation region and returns to the evaporation region by capillary action within the wick.

2. A discharge cell as in claim 1, wherein:

said elements are a plurality of windows in said discharge chamber, each window being adjacent to one of said wicks, and positioned so that said wicks are between said windows and a central portion of said discharge chamber.

3. A discharge cell as in claim 1, wherein:

said elements are a pair of mirrors, each mirror being adjacent to one of said wicks and positioned so that said wicks are between said mirrors and a central portion of said discharge chamber so that said mirrors form a resonant cavity within said discharge chamber.

4. A discharge cell suitable for use in a vapor laser comprising:

a discharge chamber of electrically insulating material;

a pair of electrodes located within said chamber, said electrodes being separated from each other by a discharge path;

a pair of wicks, each wick having an evaporation region and a condensation region, said wicks being located between said electrodes within said chamber, said wicks being separated from each other;

a vapor source material absorbed within said wicks;

a source of electrical power connected between said electrodes for iniating and maintaining an electrical discharge within said chamber, said electrical discharge maintaining the temperature at said evaporation regions of said wicks at the evaporation temperature of said vapor source material;

a pair of windows, each of said windows being adjacent to one of said electrodes, and positioned so that said wicks are between said windows;

a temperature controlling means surrounding portions of said discharge chamber containing condensation regions of said wicks for maintaining the temperature within said portions of said chamber at the condensation temperature of said vapor source material, such that vapor which is evaporated from each of said evaporation regions circulates to the corresponding condensation region and returns to the evaporation region by capillary action within the wick thereby preventing the vapor from condensing on said windows.

5. A discharge cell as in claim 4 wherein said discharge chamber further comprises:

a gas inlet orifice connected means for introducing neutral gas and controlling the pressure thereof, thereby controlling the vapor density within the discharge chamber.

6. A discharge cell as in claim 5 further comprising:

second temperature controlling means surrounding a central portion of said discharge chamber, said central portion of said discharge chamber containing evaporation regions of said wicks, for maintaining the temperature within said central portion of said discharge chamber at the evaporation temperature of said vapor source material.

7. A discharge cell as in claim 4 further comprising:

second temperature controlling means surrounding a central portion of said discharge chamber, said central portion of said discharge chamber containing evaporation regions of said wicks, for maintaining the temperature within said central portion of said discharge chamber at the evaporation temperature of said vapor source material.

* * * * *